(12) United States Patent
Ertmer

(10) Patent No.: US 9,259,797 B2
(45) Date of Patent: Feb. 16, 2016

(54) POSITIONING ATTACHMENT FOR A WELDING TORCH

(75) Inventor: Jonathan R. Ertmer, Greenville, WI (US)

(73) Assignee: ILLINOIS TOOL WORKS INC., Glenview, IL (US)

(*) Notice: Subject to any disclaimer, the term of this patent is extended or adjusted under 35 U.S.C. 154(b) by 2106 days.

(21) Appl. No.: 12/403,240

(22) Filed: Mar. 12, 2009

(65) Prior Publication Data

US 2009/0230107 A1  Sep. 17, 2009

Related U.S. Application Data

(60) Provisional application No. 61/036,588, filed on Mar. 14, 2008.

(51) Int. Cl.
*B23K 9/32* (2006.01)
*B23K 9/12* (2006.01)

(52) U.S. Cl.
CPC .. *B23K 9/32* (2013.01); *B23K 9/126* (2013.01)

(58) Field of Classification Search
USPC ...... 219/124.22, 136, 137.31, 137 R, 137.42, 219/137.43, 74
See application file for complete search history.

(56) References Cited

U.S. PATENT DOCUMENTS

| | | | | |
|---|---|---|---|---|
| 1,994,700 | A * | 3/1935 | Halbing et al. | 228/53 |
| 2,845,524 | A * | 7/1958 | Morley, Jr. et al. | 219/127 |
| 4,914,268 | A * | 4/1990 | Hixon et al. | 219/121.14 |
| 5,147,997 | A * | 9/1992 | Haberman | 219/121.5 |
| 5,635,091 | A * | 6/1997 | Hori et al. | 219/137.61 |
| 2003/0034337 | A1* | 2/2003 | Boehnlein | 219/124.22 |

* cited by examiner

*Primary Examiner* — Thien S Tran
(74) *Attorney, Agent, or Firm* — Fletcher Yoder P.C.

(57) ABSTRACT

A positioning attachment for definition of torch angle and torch to workpiece distance during welding and/or training is provided. The positioning attachment includes one or more legs of equal or varied lengths capped with a tip, which contacts the workpiece, and a body, which may be permanently attached or removably secured to the welding torch nozzle. Certain embodiments may be made of heat resistant metals or ceramic to withstand high temperatures during welding. The positioning attachment may be mounted on the welding torch nozzle or provided as an extension of the contact tip.

18 Claims, 3 Drawing Sheets

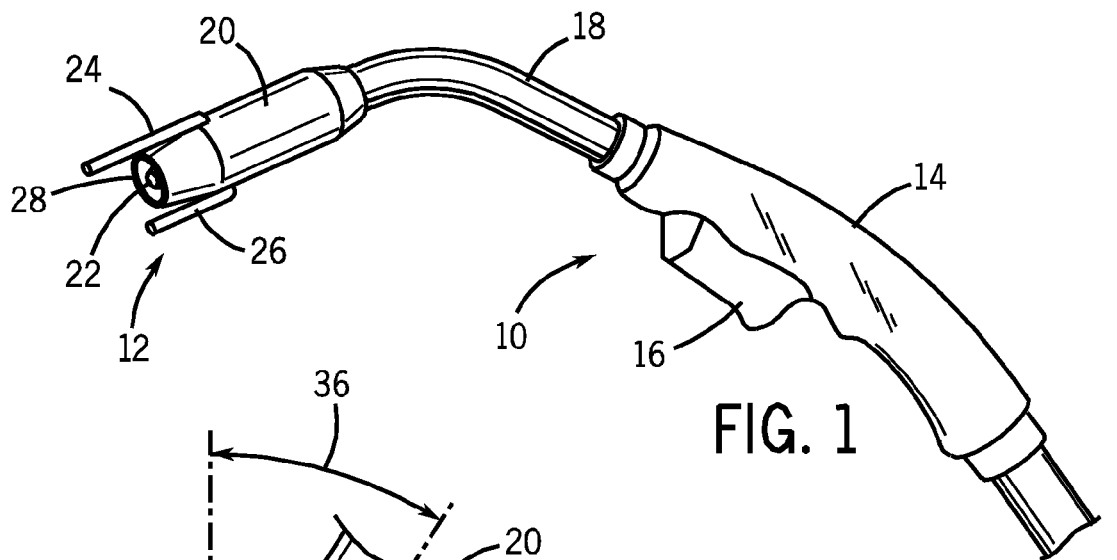
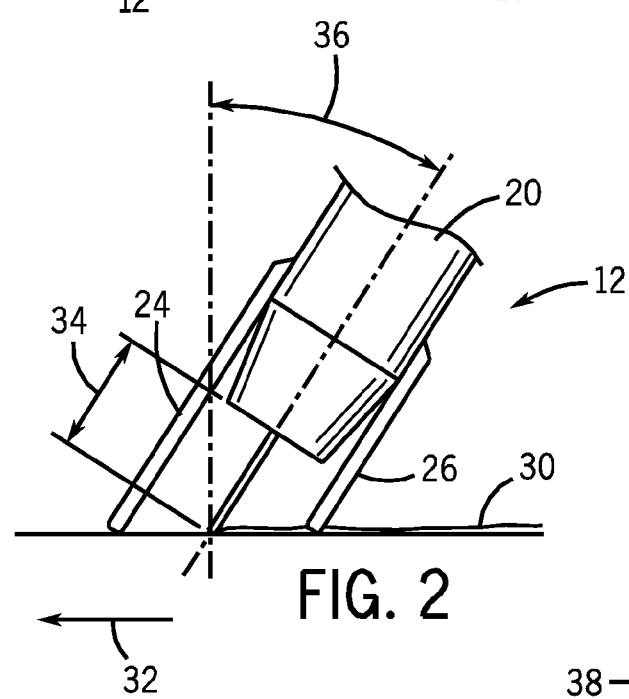
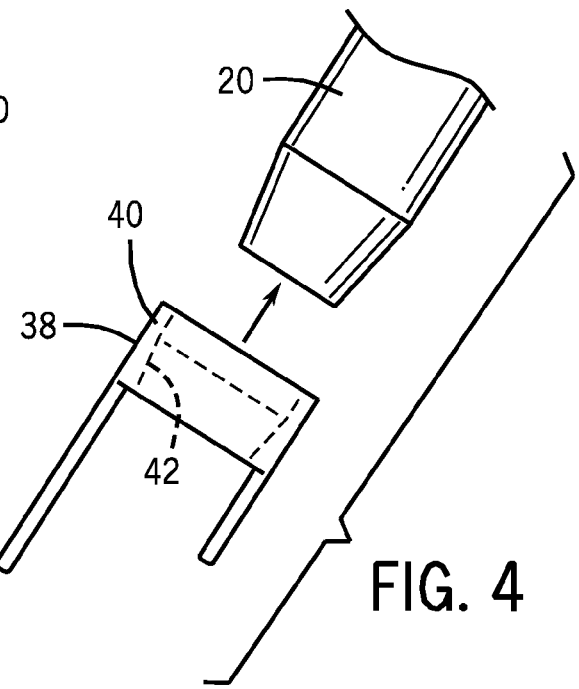
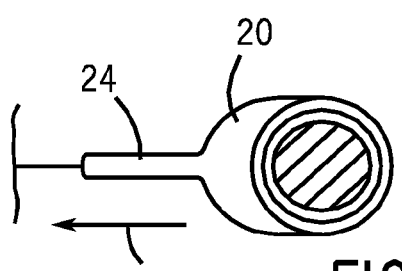

US 9,259,797 B2

POSITIONING ATTACHMENT FOR A WELDING TORCH

CROSS REFERENCE TO RELATED APPLICATIONS

This application is a Non-provisional Patent Application of U.S. Provisional Patent Application No. 61/036,588, entitled "Training Nozzle/Tip for Welding Applications", filed Mar. 14, 2008, which is herein incorporated by reference.

BACKGROUND

The invention relates generally to welding guns, and more particularly to positioning attachments for controlling torch angle and/or torch to workpiece height during welding.

Welding is a process that has increasingly become ubiquitous in all industries. While such processes may be automated in certain contexts, a large number of applications continue to exist for manual welding operations, the success of which relies heavily on the proper use of a welding gun or torch. For instance, an improper torch angle can lead to a spatter, improper penetration, and overall poor weldments. However, inexperienced welders often have difficulty establishing the proper torch angle and torch to workpiece distance during welding, and such skills may be somewhat difficult to teach. Furthermore, even experienced welders may have difficulty maintaining these important parameters throughout welding processes.

Certain gas nozzles have been proposed that are used to establish the proper torch to workpiece distance during spot welding. However, these nozzles are less than satisfactory in addressing the overall problem, in particular because they do not establish the proper torch angle, are limited in scope to spot welding applications, and do not teach proper technique. Therefore, there exists a need for a device that will aid welders or welding trainees in establishing the proper torch angle and torch to workpiece distance.

BRIEF DESCRIPTION

The present invention provides a device designed to respond to such needs. The invention may be used in conjunction with a variety of welding guns as well as for multiple types of welding. It may be used solely for training purposes or during routine welding operations as well. In particular, the invention provides a positioning attachment for guidance of torch angle and/or torch to workpiece distance. The positioning attachment may contain one or more legs of equal or different lengths, that may be capped with a tip, and that contact the workpiece. The leg or legs extend from a body, which may be permanently attached or removably secured to the welding torch nozzle, or any other component of the welding torch. Certain embodiments may be made of heat resistant metals or ceramic to withstand high temperatures during welding.

DRAWINGS

These and other features, aspects, and advantages of the present invention will become better understood when the following detailed description is read with reference to the accompanying drawings in which like characters represent like parts throughout the drawings, wherein:

FIG. 1 is a perspective view of a welding torch with a positioning attachment;

FIG. 2 is a side elevation view of a weld and a welding nozzle with a positioning attachment;

FIG. 3 is a top perspective view of a welding nozzle with a positioning attachment;

FIG. 4 is a further view of the add-on attachment and the welding nozzle;

DETAILED DESCRIPTION

Figure 5:
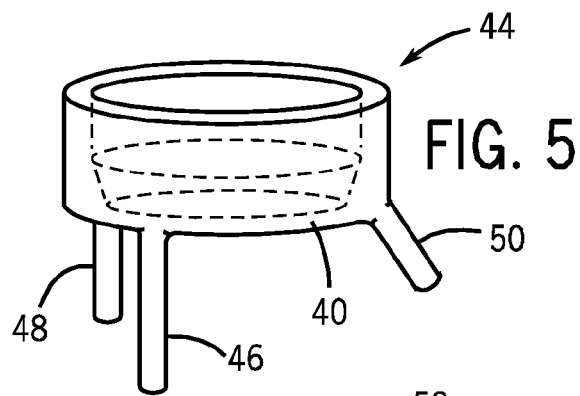
FIG. 5 is a side elevation view of a three-legged positioning attachment.

FIG. 1 illustrates a welding torch 10 that incorporates a positioning attachment 12, which establishes the proper torch angle and/or torch to workpiece height during welding or welding training. The torch 10 has a handle 14 with a trigger 16, which a welder may use to start and stop welding. An extension 18 from the handle 14 is connected to a nozzle 20. A contact tip 22 extends outward from the inner cavity of the nozzle 20. One embodiment of the present invention, which includes two positioning legs 24, 26 permanently attached to the outside of the nozzle on either side of the aperture 28, is shown in FIG. 1. During welding, wire is fed out of the contact tip 22 while gas is fed out of the aperture 28 into the welding area. In certain embodiments, the positioning attachment 12 may be made of a metal, such as brass or steel, which is resistant to the heat generated during welding. In other embodiments, the positioning attachment 12 may be made of ceramic. It should be noted that, although the embodiments illustrated in the figures relate generally to metal inert gas (MIG) welding arrangements, the invention may be adaptable to other systems and technologies, such as tungsten inert gas (TIG) torches.

FIG. 2 illustrates one embodiment of the present invention in which the positioning attachment 12 is permanently secured to the welding gun nozzle 20. In this embodiment, one positioning leg 24 may be longer than the second positioning leg 26 so that the gun can be precisely positioned during the weld 30. In the illustration of FIG. 2, for example, the weld 30 is progressing in a right to left direction 32. The positioning attachment 12 ensures that a proper torch to weld height 34 and torch angle 36 are maintained as welding proceeds in the indicated direction 32. FIG. 3 illustrates a top perspective view of this weld process. The first positioning leg 24 is located in front of the weld as the nozzle 20 moves in the indicated direction 32.

FIG. 4 illustrates one possible embodiment of the present invention. In this embodiment, an add-on attachment 38 is the means for removably securing the positioning attachment 12 to the nozzle 20. The body 40 of the add-on attachment 38 is positioned around the nozzle 20 while the inner surface 42 of the add-on attachment 38 fits onto the tip of the nozzle 20. In this embodiment, the positioning attachment 12 is removably secured to the nozzle 20, enabling easy replacement and mobility between torches.

Figure 6:
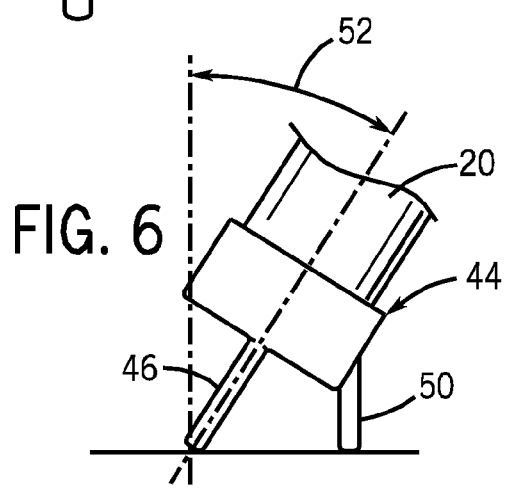
FIG. 6 is a side elevation view of the positioning attachment in a welding position.

FIG. 5 illustrates a three leg positioning attachment 44. In this embodiment of the present invention, two opposed positioning legs 46, 48 are of equal length and are perpendicular to the body 40 of the positioning attachment 12. The third rear leg 50 is a different length and connects to the body 40 at an angle. The three positioning legs 46, 48, 50 establish a fixed torch angle and torch to work piece height. In certain embodiments, the three leg positioning attachment 44 is made of a heat resistant metal while in other embodiments it may be made of ceramic. FIG. 6 illustrates a side elevation view of the three leg positioning attachment 44 connected to the welding nozzle 20 during welding. The opposed leg 46 and the rear leg 50 define the proper torch angle 52 as the welding torch is moved along the workpiece. It should also be noted that, where desired, the legs may all be of different lengths, and the one leg may follow along the center of the intended weld, or may be displaced to the side of the intended weld location. Additionally, in further embodiments, the positioning attachment 44 may have more than three legs, which establish the proper torch angle and/or torch to workpiece height during welding or welding training.

Figure 7:
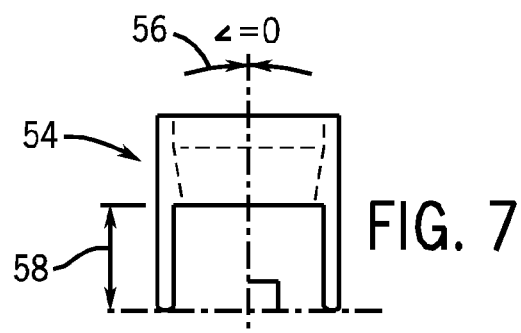
FIG. 7 is a front elevation view of a positioning attachment with two equal length legs.
Figure 8:
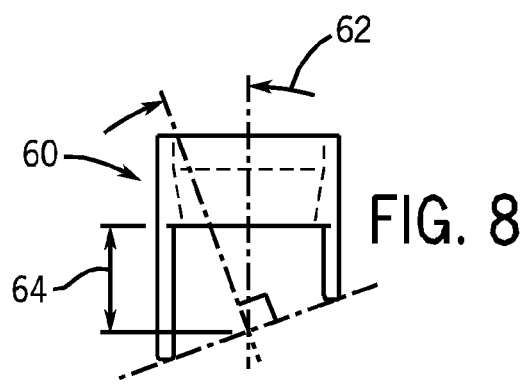
FIG. 8 is a front elevation view of a positioning attachment with two slightly unequal length legs.
Figure 9:
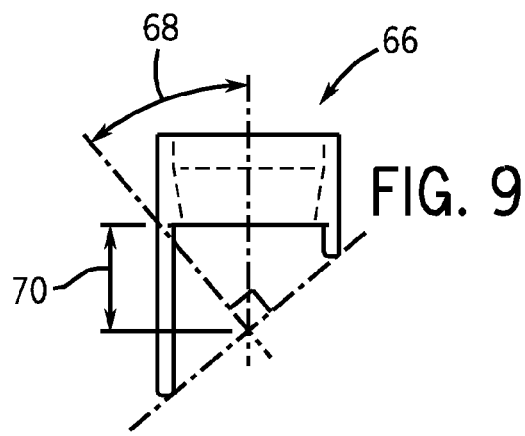
FIG. 9 is a front elevation view of a positioning attachment with two unequal length legs.

FIG. 7 is an illustration of a side elevation view of a level positioning attachment 54 in which the positioning legs are the same length. In this embodiment, the torch angle 56 is set to zero (i.e., generally perpendicular to the workpiece), and the torch to workpiece height is fixed 58. In another embodiment, the positioning legs are of unequal lengths, and an angled attachment 60 is formed as shown in FIG. 8. The unequal leg lengths create a torch angle 62, which is greater than that of the level positioning attachment 54, and a fixed torch to workpiece height 64. In a similar embodiment, an angled attachment 66 has positioning legs that are of more unequal lengths, leading to an even greater torch angle 68 and a fixed torch to workpiece length 70. In other embodiments, the lengths of the positioning legs may be any combination of intermediates between the shown illustrations.

Figure 10:
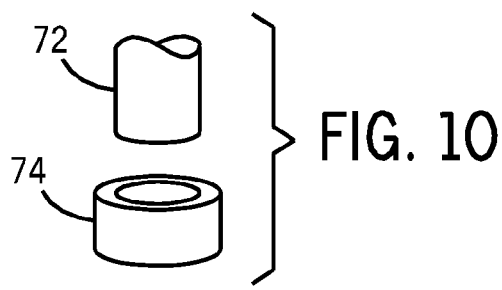
FIG. 10 is a front elevation view of a leg of the positioning attachment and a tip.

FIG. 10 illustrates the positioning leg end 72 and a tip 74, which securely fit together in the assembled positioning attachment 12. In certain embodiments, the positioning tip 74 may be made of a heat resistant metal or ceramic such that it may interface with (e.g., contact) the workpiece in an area of intense heat from the weld. The removability of the tip 74 allows for easy replacement should it wear or degrade over time.

Figure 11:
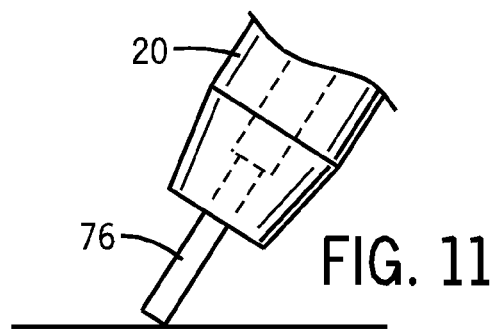
FIG. 11 is a side elevation view of a welding nozzle with a contact tip extension.
Figure 12:
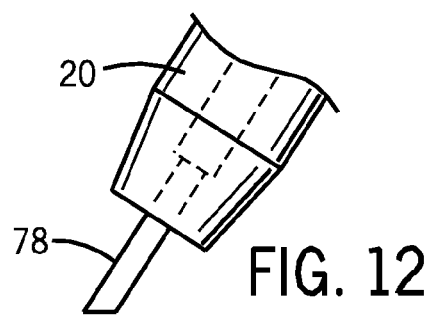
FIG. 12 is a side elevation view of a welding nozzle with an angled contact tip extension.

FIG. 11 is an illustration of one embodiment of the present invention in which the positioning attachment 12 takes the form of a special contact tip extension 76. This extension 76 extends inside the nozzle 20. This embodiment could either be used solely for training purposes, that is, for illustration of the correct torch angle and torch to workpiece length, or for welding as well as training if the extension 76 is made of a material sufficiently resistant to the temperatures present during welding. FIG. 12 shows another adaptation of this embodiment where the contact tip extension 78 is angled. The extension 78 still extends into the nozzle 20 and defines the proper torch angle and/or torch to workpiece distance.

Figure 13:
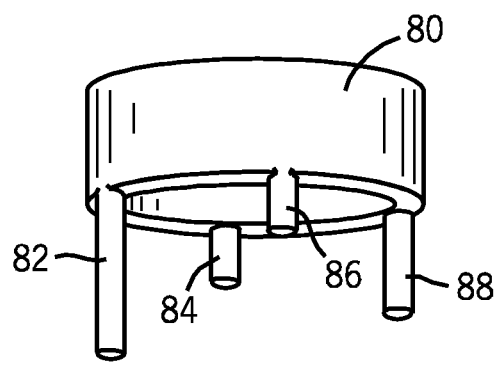
FIG. 13 is a perspective view of a further embodiment including 4 legs or prongs of unequal length.

FIG. 13 illustrates a further embodiment in which the torch attachment includes 4 legs. As in the previous embodiments, the attachment includes a body 80 that may be configured for snapping onto or otherwise fitting to an end (e.g., a nozzle) of a welding torch. This embodiment, however, includes a front leg 82, two side legs 84 and 86, and a rear leg 88. The lengths of the legs are selected to properly orient a torch to which the device would be attached. In this embodiment, for example, the front leg 82 is longer than the rear leg 88, causing the torch to be leaned downwardly during welding, with the front leg riding along a line where a weld is to be formed, and the rear leg riding over a progressing weld. The two side legs are shorter than both the front and the rear legs, and may contact workpieces on either side of a progressing weld. This embodiment may be particularly well suited to welds formed between workpieces joined at an angle.

Figure 14:
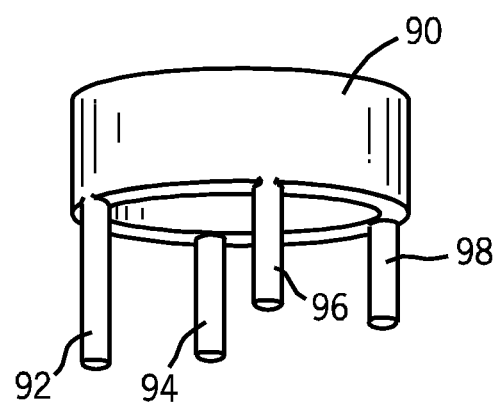
FIG. 14 is a perspective view of another embodiment having 4 legs.

FIG. 14 illustrates another embodiment of the attachment with 4 legs. In this embodiment, a body 90 has a front leg 92 extending from it, with two intermediate legs 94 and 96 somewhat shorter than the front leg, and a read leg 98 somewhat shorter still. The attachment will cause the torch to be leaned downwardly with the front leg again riding along a line where a weld is to be formed, and the rear leg riding over a progressing weld. The side legs will then ride along sides of the weld. This embodiment may be well suited for welds formed between abutted workpieces (e.g., plates).

In both embodiments with 4 legs, the lengths of the legs may be selected to provide the proper height of the torch about the weld location, and the proper angle of the torch with respect to the workpiece or workpieces. The side legs, for example, may be the same or different lengths to provide for a particular orientation of the torch. Similarly, other arrangements may be envisioned in which the legs are intended to straddle the weld rather than to ride along an intended weld line or a recently formed weld.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A positioning attachment for a welding torch comprising:
   two or more legs extending from a nozzle of the welding torch and being configured to extend from the nozzle of the welding torch toward a workpiece to touch the workpiece to define either a distance between the welding torch and the workpiece, an angle of the welding torch with respect to the workpiece, or both; and
   wherein the two or more legs comprises a first leg and a second leg, a second length of the second leg is different than a first length of the first leg, and the second length of the second leg determines the angle of the welding torch with respect to the workpiece.

2. The attachment of claim 1, comprising a third leg having the first length and being configured to extend from the nozzle of the welding torch to touch the workpiece during welding.

3. The attachment of claim 1, wherein the two or more legs are permanently attached to the nozzle of the welding torch.

4. The attachment of claim 1, wherein the attachment is configured to be removably secured to the nozzle of the welding torch.

5. The attachment of claim 1, wherein the attachment is part of a contact tip of the welding torch.

6. The attachment of claim 1, comprising a replaceable tip secured to an end of at least one of the two or more legs.

7. The attachment of claim 1, wherein the attachment is made of a metal resistant to heat developed during a welding operation.

8. The attachment of claim 1, wherein the attachment is made of a ceramic material.

9. A positioning attachment for a welding torch comprising:
- a body configured to be removably secured to a welding torch nozzle;
- a plurality of legs extending from the body at the location of the welding torch nozzle toward a workpiece to touch the workpiece to define a distance between the welding torch and the workpiece, and an angle of the torch with respect to the workpiece; and
- wherein the plurality of legs comprises a first leg and a second leg, a second length of the second leg is different than a first length of the first leg, and the second length of the second leg determines the angle of the welding torch with respect to the workpiece.

10. The attachment of claim 9, comprising a third leg having the first length and being configured to extend from the welding torch nozzle to touch the workpiece during welding.

11. The attachment of claim 9, comprising a replaceable tip secured to an end of each of the legs.

12. The attachment of claim 9, wherein the body and legs are made of a material resistant to heat developed during a welding operation.

13. The attachment of claim 12, wherein the attachment comprises 4 legs of at least 3 different lengths.

14. The attachment of claim 12, wherein the attachment is made of a metal or ceramic material.

15. A positioning attachment for a welding torch comprising:
- a welding torch;
- a nozzle secured to the welding torch;
- a plurality of legs extending from the nozzle toward a workpiece to touch the workpiece during welding to define a distance between the welding torch and the workpiece, and an angle of the torch with respect to the workpiece; and
- wherein the plurality of legs comprises a first leg and a second leg, a second length of the second leg is different than a first length of the first leg, and the second length of the second leg determines the angle of the welding torch with respect to the workpiece.

16. The attachment of claim 15, wherein the plurality of legs comprises 4 legs of at least 3 different lengths.

17. The attachment of claim 15, comprising a third leg extending from the nozzle and having the first length.

18. The attachment of claim 15, comprising a replaceable tip secured to an end of each of the legs.

* * * * *